(12) United States Patent
Lan et al.

(10) Patent No.: US 10,848,020 B2
(45) Date of Patent: Nov. 24, 2020

(54) MOTOR STATOR ASSEMBLY, MOTOR AND ELECTRIC VEHICLE HAVING THE SAME

(71) Applicant: NIO NEXTEV LIMITED, Hong Kong (CN)

(72) Inventors: Hongyu Lan, Shanghai (CN); Shengchuan Zhang, Shanghai (CN); Peng Li, Shanghai (CN); Shixiang Zhang, Shanghai (CN); Liwen Xu, Shanghai (CN); Zhaohui Zhuang, Shanghai (CN)

(73) Assignee: NIO NEXTEV LIMITED, Hong Kong (CN)

( * ) Notice: Subject to any disclaimer, the term of this patent is extended or adjusted under 35 U.S.C. 154(b) by 267 days.

(21) Appl. No.: 15/982,160

(22) Filed: May 17, 2018

(65) Prior Publication Data
US 2018/0337566 A1   Nov. 22, 2018

(30) Foreign Application Priority Data
May 17, 2017   (CN) .................... 2017 2 0545895 U

(51) Int. Cl.
*H02K 1/16* (2006.01)
*H02K 3/28* (2006.01)
*B60L 50/51* (2019.01)

(52) U.S. Cl.
CPC .............. *H02K 1/165* (2013.01); *B60L 50/51* (2019.02); *H02K 3/28* (2013.01); *B60L 2220/50* (2013.01); *Y02T 10/64* (2013.01)

(58) Field of Classification Search
CPC . H02K 1/16; H02K 1/165; H02K 3/28; B60L 11/18; B60L 50/51; B60L 2220/50; Y02T 10/641
(Continued)

(56) References Cited

U.S. PATENT DOCUMENTS 4,743,828 A * 5/1988 Jahns ................... B63G 8/08
                                                  318/810
5,898,251 A    4/1999 Mochizuki et al.
(Continued)

FOREIGN PATENT DOCUMENTS

CN    101136572    3/2008
CN    102035271    4/2011
(Continued)

OTHER PUBLICATIONS

English Translation of International Search Report and Written Opinion for International (PCT) Patent Application No. PCT/CN2017/091891, dated Feb. 13, 2018, 5 pages.

*Primary Examiner* — Naishadh N Desai
(74) *Attorney, Agent, or Firm* — Sheridan Ross P.C.

(57) ABSTRACT

The utility model discloses a motor stator assembly, a motor and an electric vehicle having the motor. The motor stator assembly comprises a stator iron core and at least two sets of symmetrical three-phase windings, which are arranged to wind the stator iron core respectively, wherein phase differences among three phases $U_i$, $V_i$ and $W_i$ of each set of the three-phase windings are a 120° electrical angle, and i is the set number of the three-phase windings. In order to address the problem of high output power of drive system, the motor stator assembly uses two sets of three-phase windings having a symmetrical spatial arrangement, and each set of windings is considered as an independent unit and is controlled via a power device respectively; finally, the output powers are superimposed so that the capacity of the inverter is increased while also avoiding problems of equalized current and over-voltage.

15 Claims, 1 Drawing Sheet

(58) Field of Classification Search
USPC ................................................ 310/179–210
See application file for complete search history.

(56) References Cited

U.S. PATENT DOCUMENTS

| | | | | |
|---|---|---|---|---|
| 2004/0263001 | A1* | 12/2004 | Yamanaka | ............. H02K 41/03 |
| | | | | 310/12.01 |
| 2014/0028143 | A1* | 1/2014 | Ishigami | .................. H02K 3/00 |
| | | | | 310/208 |
| 2014/0232181 | A1* | 8/2014 | Tsuji | ..................... H02M 7/003 |
| | | | | 307/10.1 |
| 2016/0181876 | A1* | 6/2016 | Kawasaki | ................ H02K 3/28 |
| | | | | 180/444 |
| 2016/0336884 | A1* | 11/2016 | Matsuoka | ................. H02P 6/10 |
| 2017/0353071 | A1* | 12/2017 | Saito | ........................ H02K 3/12 |

FOREIGN PATENT DOCUMENTS

| | | |
|---|---|---|
| CN | 203261208 | 10/2013 |
| CN | 106130289 | 11/2016 |
| CN | 106357018 | 1/2017 |

\* cited by examiner

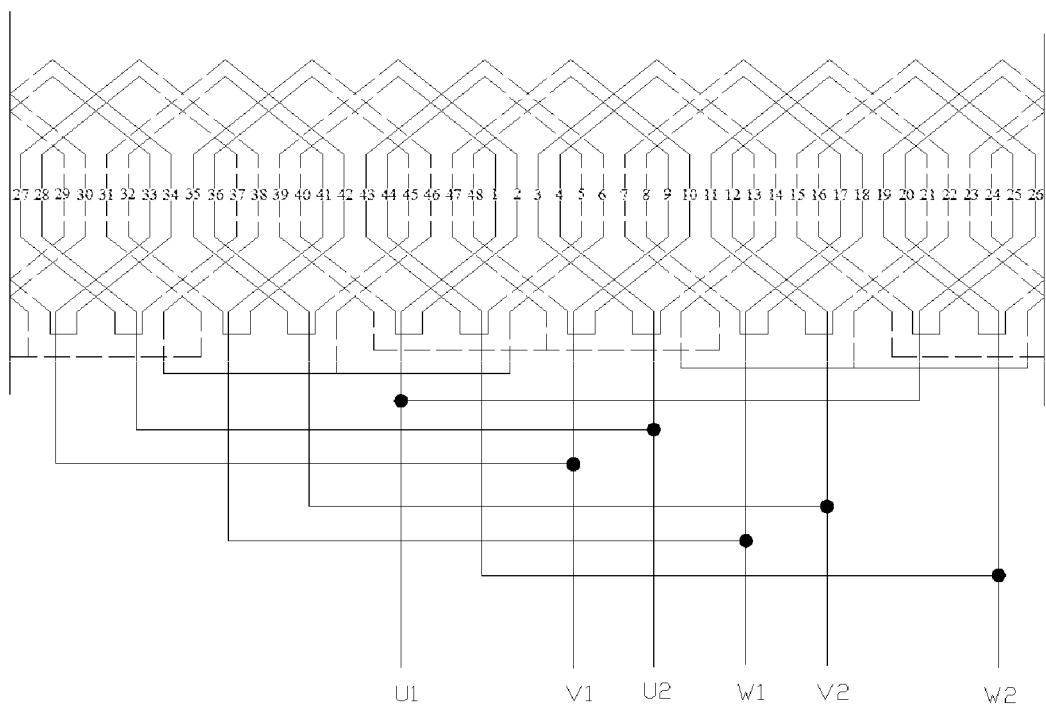

MOTOR STATOR ASSEMBLY, MOTOR AND ELECTRIC VEHICLE HAVING THE SAME

CROSS-REFERENCE TO RELATED APPLICATIONS

This application claims the benefit of China Patent Application No. 201720545895.6 filed May 17, 2017, the entire contents of which are incorporated herein by reference.

FIELD OF THE INVENTION

The utility model relates to the field of motor, and more specifically, to a motor having a motor stator assembly with dual windings.

BACKGROUND

Currently, with the widely spread application of electric vehicles and user's increasing demands on the performances of electric vehicles, the power required by the vehicle drive system which serves as a core component of electric vehicle is also increased gradually. However, due to limitation by power levels of electrical and electronic devices, the application of a conventional two-level voltage source inverter has encountered difficulties in some high power drive situations. In a multi-level inverter, by designing an appropriate power circuit structure and a corresponding modulating algorithm, a low voltage power device can be used to realize a high voltage output; however, for situations where power supplying voltage is limited, the multi-voltage technology is not applicable, and in these situations, a multi-phase motor drive system is more suitable.

For a multi-phase motor drive system, a three-phase drive system is nowadays still dominating. This is because for a long time, the wide use of the three-phase motor enables it to have advantages of low cost and standardization. In a situation of limited vehicle space, designing a three-phase motor which has a reasonable structure and a high reliability so as to meet high power requirement has become one of difficulties in the research of drive systems.

In a conventional way, the increase of output power level of the drive system can be realized by increasing phase voltage and phase current of the three-phase system thereof.

However, for the first aspect, the increase of voltage level will necessarily lead to an increase of insulation level of the motor's windings, thus posing a challenge to the manufacture of motor; moreover, since the electrical and electronic devices are limited by pressure resistant level of themselves, in a high power inverter, a bridge arm of the inverter circuit has to be constituted by a plurality of switch devices connected in series; by doing so, dynamic and static pressure equalizing problem has arisen, making the design and manufacture of inverter difficult and making the reliability not high.

For the second aspect, in a low voltage situation, in order to realize a high power output, a phase current of the stator has to be increased, thus leading to server heating of the motor; secondly, in order to decrease a current stress in the three-phase inverter switch device, a plurality of IGBT switch devices have to be connected in parallel, which will also make the design of the inverter become more complicated.

SUMMARY OF THE INVENTION

An object of the utility model is to provide a motor stator assembly which is easy to control and has a high output power.

Another object of the utility model is to provide a motor which is easy to control and has a high output power.

Further another object of the utility model is to provide an electric vehicle which is easy to control and has a motor with high output power.

In order to achieve the objects of the utility model, according to an aspect of the utility model, a motor stator assembly is provided, comprising: a stator iron core; and at least two sets of symmetrical three-phase windings, which are arranged to wind the stator iron core respectively, wherein phase differences among three phases Ui, Vi and Wi of each set of the three-phase windings are a 120° electrical angle, and i is the set number of the three-phase windings.

Optionally, the motor stator assembly comprises two sets of three-phase windings, wherein a phase difference between the same phases of the first set of three-phase windings and the second set of three-phase windings is a 180° electrical angle.

Optionally, the stator iron core has 48 stator slots, and the number of poles is 4; and each phase of the individual three-phase windings occupies 2 stator slots.

Optionally, a stator slot span of each phase itself in the three-phase windings is 9 and 11, and the numbers of coil turns in individual stator slots are the same.

Optionally, each phase of Ui, Vi and Wi comprises two parallel branches.

Optionally, a first parallel branch of U1 phase of the first set of three-phase windings is formed by winding a coil along stator slots 1-40-2-39, and a second parallel branch of U1 phase of the first set of three-phase windings is formed by winding a coil along stator slots 25-16-26-15; a first parallel branch of V1 phase of the first set of three-phase windings is formed by winding a coil along stator slots 9-48-10-47, and a second parallel branch of V1 phase of the first set of three-phase windings is formed by winding a coil along stator slots 33-24-34-23; a first parallel branch of W1 phase of the first set of three-phase windings is formed by winding a coil along stator slots 17-8-18-7, and a second parallel branch of W1 phase of the first set of three-phase windings is formed by winding a coil along stator slots 41-32-42-31; a first parallel branch of U2 phase of the second set of three-phase windings is formed by winding a coil along stator slots 4-13-3-14, and a second parallel branch of U2 phase of the second set of three-phase windings is formed by winding a coil along stator slots 28-37-27-38; a first parallel branch of V2 phase of the second set of three-phase windings is formed by winding a coil along stator slots 12-21-11-22, and a second parallel branch of V2 phase of the second set of three-phase windings is formed by winding a coil along stator slots 36-45-35-46; a first parallel branch of W2 phase of the second set of three-phase windings is formed by winding a coil along stator slots 20-29-19-30, and a second parallel branch of W2 phase of the second set of three-phase windings is formed by winding a coil along stator slots 44-5-43-6; wherein stator slots 1 to 48 represent 48 stator slots disposed in sequence.

Optionally, a neutral point of the coil of U1 phase of the first set of three-phase windings is lead out along stator slots 39 and 15; a neutral point of the coil of V1 phase of the first set of three-phase windings is lead out along stator slots 47 and 23; a neutral point of the coil of W1 phase of the first set of three-phase windings is lead out along stator slots 7 and 31; a neutral point of the coil of U2 phase of the second set of three-phase windings is lead out along stator slots 14 and 38; a neutral point of the coil of V2 phase of the second set of three-phase windings is lead out along stator slots 22 and 46; a neutral point of the coil of W2 phase of the second set of three-phase windings is lead out along stator slots 30 and 6.

Optionally, the neutral points of the coils of individual phases of individual three-phase windings are independent from each other, and magnetic circuits of individual three-phase windings are independent from each other.

Optionally, a terminal of the coil of U1 phase of the first set of three-phase windings is lead out along stator slots 1 and 25; a terminal of the coil of V1 phase of the first set of three-phase windings is lead out along stator slots 9 and 33; a terminal of the coil of W1 phase of the first set of three-phase windings is lead out along stator slots 7 and 41; a terminal of the coil of U2 phase of the second set of three-phase windings is lead out along stator slots 4 and 28; a terminal of the coil of V2 phase of the second set of three-phase windings is lead out along stator slots 12 and 36; a terminal of the coil of W2 phase of the second set of three-phase windings is lead out along stator slots 20 and 44.

Optionally, the three-phase windings are single-layer concentric windings.

Optionally, the slot space factors of individual stator slots of the stator iron core are the same.

Optionally, the windings of individual phases of each of the three-phase windings have identical resistance and inductance.

Optionally, each of the three-phase windings is independently controlled by IGBT power devices having a corresponding number.

In order to realize the objects of the utility model, according to another aspect of the utility model, a motor is further provided, which comprises the above described motor stator assembly.

In order to realize the objects of the utility model, according to further another aspect of the utility model, an electric vehicle is further provided, which comprises the above described motor.

In order to address the problem of high output power of drive system, the motor stator assembly according to the utility model uses two sets of three-phase windings having a symmetrical spatial arrangement, in which two sets of three-phase winding magnetic circuits are independent, and each set of windings is considered as an independent unit and is controlled via a power device respectively; finally, the output powers are superimposed so that the capacity of the inverter is increased while also avoiding problems of equalized current and over-voltage. In this way, the motor not only has the manufacture advantages of low cost and standardization, but also the reliability of drive system is ensured.

BRIEF DESCRIPTION OF THE DRAWINGS

FIG. 1 is a schematic view showing the wirings of an embodiment of the motor windings of the motor stator assembly of the utility model.

DETAILED DESCRIPTION

With reference to FIG. 1, a specific embodiment of the wirings of the windings in the motor stator assembly is shown. Specifically, the motor stator assembly comprises a stator iron core and at least two sets of symmetrical three-phase windings which are arranged to wind the stator iron core respectively, wherein phase differences among three phases Ui, Vi and Wi of each set of the three-phase windings are a 120° electrical angle, and i is the set number of the three-phase windings. Moreover, the currents input to U1 and U2 are currents from different circuits so that mutual interferences between windings U1 and U2 can be reduced. The currents from different circuits can be currents input to U1 and U2 respectively from different current input sources or the same power source after being shunted. Herein, several sets of symmetrical three-phase windings having three phases Ui, Vi, Wi are provided so that the three-phase windings are spatially symmetrically arranged and the magnetic circuits are independent. Therefore, each set of windings is considered as an independent unit. On one hand, low cost and standardization of motor manufacture are realized, and on the other hand, by superimposing the output powers of multiple sets of independent three-phase windings, the capacity of the inverter is increased while also avoiding problems of equalized current and over-voltage and ensuring the reliability of drive system.

Various settings of the motor stator assembly will be described hereinafter by taking a motor stator assembly comprising two sets of three-phase windings as an example. Firstly, in order to ensure the spatially symmetrical arrangement of the two sets of three-phase windings, a phase difference between the same phases of the first set of three-phase windings and the second set of three-phase windings is a 180° electrical angle. That is, phase differences between U1 and U2, between V1 and V2, and between W1 and W2 are all 180° electrical angle. Moreover, the corresponding stator iron core in the motor stator assembly has 48 stator slots, and the number of poles is 4. At this point, each phase of each three-phase winding can occupy two stator slots.

The specific wirings will be described below in combination with FIG. 1 by taking a motor stator assembly comprising two sets of three-phase windings as an example. In order to facilitate description, in the following, stator slots 1 to 48 will respectively indicate 48 stator slots disposed in sequence. In this embodiment, each phase of Ui, Vi and Wi comprises two parallel branches, wherein a first parallel branch of U1 phase of the first set of three-phase windings is formed by winding a coil along stator slots 1-40-2-39, and a second parallel branch of U1 phase of the first set of three-phase windings is formed by winding a coil along stator slots 25-16-26-15; a first parallel branch of V1 phase of the first set of three-phase windings is formed by winding a coil along stator slots 9-48-10-47, and a second parallel branch of V1 phase of the first set of three-phase windings is formed by winding a coil along stator slots 33-24-34-23; a first parallel branch of W1 phase of the first set of three-phase windings is formed by winding a coil along stator slots 17-8-18-7, and a second parallel branch of W1 phase of the first set of three-phase windings is formed by winding a coil along stator slots 41-32-42-31; a first parallel branch of U2 phase of the second set of three-phase windings is formed by winding a coil along stator slots 4-13-3-14, and a second parallel branch of U2 phase of the second set of three-phase windings is formed by winding a coil along stator slots 28-37-27-38; a first parallel branch of V2 phase of the second set of three-phase windings is formed by winding a coil along stator slots 12-21-11-22, and a second parallel branch of V2 phase of the second set of three-phase windings is formed by winding a coil along stator slots 36-45-35-46; a first parallel branch of W2 phase of the second set of three-phase windings is formed by winding a coil along stator slots 20-29-19-30, and a second parallel branch of W2 phase of the second set of three-phase windings is formed by winding a coil along stator slots 44-5-43-6. As can be known from the above wirings, a stator slot span of each phase itself in the three-phase windings is 9 and 11. For example, as can be known from the wirings of the first parallel branch of U1 phase, the span thereof is from stator slot 1-40 to stator slot 2-39, i.e., corresponding to a span of 9 stator slots and a span of 11 stator slots. In this way, a wiring of single-layer concentric windings is provided, which has the advantages of convenient processing and high utilization of stator slots, etc.

In addition, a neutral point of the coil of U1 phase of the first set of three-phase windings is lead out along stator slots 39 and 15; a neutral point of the coil of V1 phase of the first set of three-phase windings is lead out along stator slots 47 and 23; a neutral point of the coil of W1 phase of the first set of three-phase windings is lead out along stator slots 7 and 31; a neutral point of the coil of U2 phase of the second set of three-phase windings is lead out along stator slots 14 and 38; a neutral point of the coil of V2 phase of the second set of three-phase windings is lead out along stator slots 22 and 46; a neutral point of the coil of W2 phase of the second set of three-phase windings is lead out along stator slots 30 and 6. Moreover, different three-phase windings use different current sources as inputs. At this time, the neutral points of the coils of individual phases of individual three-phase windings are independent from each other, and magnetic circuits of individual three-phase windings are independent from each other. No circulating current phenomenon or coupling phenomenon will occur between windings.

In addition, a terminal of the coil of U1 phase of the first set of three-phase windings is lead out along stator slots 1 and 25; a terminal of the coil of V1 phase of the first set of three-phase windings is lead out along stator slots 9 and 33; a terminal of the coil of W1 phase of the first set of three-phase windings is lead out along stator slots 7 and 41; a terminal of the coil of U2 phase of the second set of three-phase windings is lead out along stator slots 4 and 28; a terminal of the coil of V2 phase of the second set of three-phase windings is lead out along stator slots 12 and 36; a terminal of the coil of W2 phase of the second set of three-phase windings is lead out along stator slots 20 and 44, with the purpose of providing terminal ports respectively and performing independent controls via two sets of IGBT power devices respectively; finally, the output powers of the two sets of three-phase windings are superimposed so as to increase the output power of the entire system.

At this time, in order to achieve a balance of performances of the two sets of windings, the same number of coil turns should be disposed in individual stator slots in the stator iron core, the slot space factors of individual stator slots should be the same, and the windings of individual phases of each of the three-phase windings should have identical resistance and inductance.

As compared to increasing power output by increasing phase voltage or phase current, the present embodiment has a wider range of application and a higher reliability. For example, in a case where power supplying voltage or current is limited, in order to realize a high power output, a structure of two sets of spatially symmetrical stator windings is used so that the magnetic circuits of the two sets of three-phase windings are independent, which are each considered as an independent unit and are controlled by two IGBT power devices respectively. Then, only a conventional three-phase motor vector control algorithm is required to be used for performing control. Finally, the powers produced by the two sets of windings are superimposed so as to increase the capacity of the inverter. In this way, not only the output power of the entire drive system is increased, but also the layout of the hardware circuit of the inverter is simplified while also avoiding problems of equalized current and over-voltage and ensuring the reliability of drive system.

In addition, the winding structure modulating algorithm used in this utility model is easier to realize, in which each set of three-phase windings is considered as a basic unit. In this way, a conventional three-phase motor vector control algorithm is applied to each set of three-phase windings respectively, and a coordinate transformation from three-phase static to two-phase static and then to two-phase rotation is performed for each three-phase motor model while also solving the problem of difficult modulating algorithm.

While the above description has been given by taking the two sets of motor windings as an example, it can be known from the teachings of the utility model that by adjusting the wiring manner of windings, a spatially symmetrical arrangement and independent magnetic circuits can be also realized for three or more sets of motor windings so that a lower power device control can be also realized and finally powers can be integrated so as to achieve the effect of increasing output power and also have an extreme high reliability.

Herein, a motor is further provided which comprises any of the above described motor stator assemblies, thereby also presenting the corresponding effect of increasing output power and having a high reliability. Therefore, a repeated description is not given herein.

In addition, an electric vehicle is further provided which comprises a motor having any of the above described motor stator assemblies, thereby also presenting the corresponding effect of increasing output power and having a high reliability. Therefore, a repeated description is not given herein.

The above examples mainly describe the motor stator assembly, the motor and the electric vehicle having the same of the utility model. While only some of the embodiments of the utility model have been described, those skilled in the art will understand that the utility model can be carried out in many other forms without departing from the spirit and scope thereof. Therefore, the illustrated examples and embodiments should be considered as illustrative rather than limiting, and the utility model can cover various modifications and replacements without departing from the spirit and scope of the utility model defined by individual appended claims.

What is claimed is:

1. A motor stator assembly, characterized by comprising:
    a stator iron core; and
    at least two sets of symmetrical three-phase windings, which are arranged to wind the stator iron core respectively,
    wherein phase differences among three phases Ui, Vi and Wi of each set of the three-phase windings are a 120° electrical angle, and i is the set number of the three-phase windings;
    wherein with respect to two sets of three-phase windings, a phase difference between the same phases of a first set of three-phase windings and a second set of three-phase windings is a 180° electrical angle;
    wherein the stator iron core has 48 stator slots, and the number of poles is 4; and each phase of the individual three-phase windings occupies 2 stator slots;
    wherein a stator slot span of each phase itself in the three-phase windings is 9 and 11, and the numbers of coil turns in individual stator slots are the same;
    wherein each phase of Ui, Vi and Wi comprises two parallel branches;
    a first parallel branch of U1 phase of the first set of three-phase windings is formed by winding a coil along stator slots 1-40-2-39, and a second parallel branch of U1 phase of the first set of three-phase windings is formed by winding a coil along stator slots 25-14-26-15;

a first parallel branch of V1 phase of the first set of three-phase windings is formed by winding a coil along stator slots 9-48-10-47, and a second parallel branch of V1 phase of the first set of three-phase windings is formed by winding a coil along stator slots 33-24-34-23;

a first parallel branch of W1 phase of the first set of three-phase windings is formed by winding a coil along stator slots 17-8-18-7, and a second parallel branch of W1 phase of the first set of three-phase windings is formed by winding a coil along stator slots 41-32-42-31;

a first parallel branch of U2 phase of the second set of three-phase windings is formed by winding a coil along stator slots 4-13-3-14, and a second parallel branch of U2 phase of the second set of three-phase windings is formed by winding a coil along stator slots 28-37-27-38;

a first parallel branch of V2 phase of the second set of three-phase windings is formed by winding a coil along stator slot 12-21-11-22, and a second parallel branch of V2 phase of the second set of three-phase windings is formed by winding a coil along stator slots 36-45-35-46;

a first parallel branch of W2 phase of the second set of three-phase windings is formed by winding a coil along stator slots 20-29-19-30, and a second parallel branch of W2 phase of the second set of three-phase windings is formed by winding a coil along stator slots 44-5-43-6;

wherein stator slots 1 to 48 represent 48 stator slots disposed in sequence.

2. The motor stator assembly according to claim 1, wherein a neutral point of the coil of U1 phase of the first set of three-phase windings is lead out along stator slots 39 and 15; a neutral point of the coil of V1 phase of the first set of three-phase windings is lead out along stator slots 47 and 23; a neutral point of the coil of W1 phase of the first set of three-phase windings is lead out along stator slots 7 and 31; a neutral point of the coil of U2 phase of the second set of three-phase windings is lead out along stator slots 14 and 38; a neutral point of the coil of V2 phase of the second set of three-phase windings is lead out along stator slots 22 and 46; a neutral point of the coil of W2 phase of the second set of three-phase windings is lead out along stator slots 30 and 6.

3. The motor stator assembly according to claim 2, wherein the neutral points of the coils of individual phases of individual three-phase windings are independent from each other, and magnetic circuits of individual three-phase windings are independent from each other.

4. The motor stator assembly according to claim 1, wherein a terminal of the coil of U1 phase of the first set of three-phase windings is lead out along stator slots 1 and 25; a terminal of the coil of V1 phase of the first set of three-phase windings is lead out along stator slots 9 and 33; a terminal of the coil of W1 phase of the first set of three-phase windings is lead out along stator slots 7 and 41; a terminal of the coil of U2 phase of the second set of three-phase windings is lead out along stator slots 4 and 28; a terminal of the coil of V2 phase of the second set of three-phase windings is lead out along stator slots 12 and 36; a terminal of the coil of W2 phase of the second set of three-phase windings is lead out along stator slots 20 and 44.

5. The motor stator assembly according to claim 1, wherein the three-phase windings are single-layer concentric windings.

6. The motor stator assembly according to claim 1, wherein the slot space factors of individual stator slots of the stator iron core are the same.

7. The motor stator assembly according to claim 1, wherein the windings of individual phases of each of the three-phase windings have identical resistance and inductance.

8. The motor stator assembly according to claim 1, wherein each of the three-phase windings is independently controlled by IGBT power devices having a corresponding number.

9. A motor characterized by comprising a motor stator assembly according to claim 1.

10. A motor characterized by comprising a motor according to claim 9.

11. The motor stator assembly according to claim 1, wherein the three-phase windings are single-layer concentric windings.

12. The motor stator assembly according to claim 1, wherein the slot space factors of individual stator slots of the stator iron core are the same.

13. The motor stator assembly according to claim 1, wherein the windings of individual phases of each of the three-phase windings have identical resistance and inductance.

14. The motor stator assembly according to claim 1, wherein each of the three-phase windings is independently controlled by IGBT power devices having a corresponding number.

15. A motor characterized by comprising a motor stator assembly according to claim 1.

* * * * *